United States Patent [19]

Wang et al.

[11] Patent Number: 5,377,035
[45] Date of Patent: Dec. 27, 1994

[54] WAVELENGTH DIVISION MULTIPLEXED FIBER OPTIC LINK FOR RF POLARIZATION DIVERSITY RECEIVER

[75] Inventors: Harry T. Wang, Thousand Oaks; Gregory L. Tangonan, Oxnard; Willie W. Ng, Agoura Hills, all of Calif.

[73] Assignee: Hughes Aircraft Company, Los Angeles, Calif.

[21] Appl. No.: 127,833

[22] Filed: Sep. 28, 1993

[51] Int. Cl.$^5$ .................. H04B 10/00; H04J 14/02
[52] U.S. Cl. .................... 359/156; 359/122; 359/124; 359/145; 359/173; 379/56; 455/101
[58] Field of Search ............... 359/114, 124, 145–146, 359/122, 156, 164, 172, 173, 181, 183, 179; 379/56; 455/101, 104

[56] References Cited

U.S. PATENT DOCUMENTS

| 4,545,075 | 10/1985 | Miller et al. | 359/145 |
| 5,251,053 | 10/1993 | Heidemann | 359/146 |

FOREIGN PATENT DOCUMENTS

| 5102894 | 4/1993 | Japan | 455/101 |

OTHER PUBLICATIONS

"Transmission Systems for Communication" by Members of the Technical Staff, Bell Telephone Laboratories, Bell Telephone Laboratories, Inc. 1970, pp. 124–139.

*Primary Examiner*—Richard E. Chilcot, Jr.
*Assistant Examiner*—Kinfe-Michael Negash
*Attorney, Agent, or Firm*—V. D. Duraiswamy; W. K. Denson-Low

[57] ABSTRACT

A single transmission optical fiber is used to transmit RF signals of the same frequency but different polarization from a source to a polarization diversity receiver without introducing interference between the signals. The incoming signal of one polarization modulates a first laser transmitter operating at one wavelength, and the incoming signal of the other polarization modulates a second laser transmitter operating at a different, second wavelength. The two modulated optical beams are combined in an optical coupler whose output is connected to the transmission fiber leading to the polarization diversity receiver. At the receiver, a wavelength division multiplexing coupler is used to separate out the two modulated optical carriers. The two RF signals used to modulate the laser transmitters are separately recovered via photodiode detectors to provide inputs to the polarization diversity receiver.

19 Claims, 1 Drawing Sheet

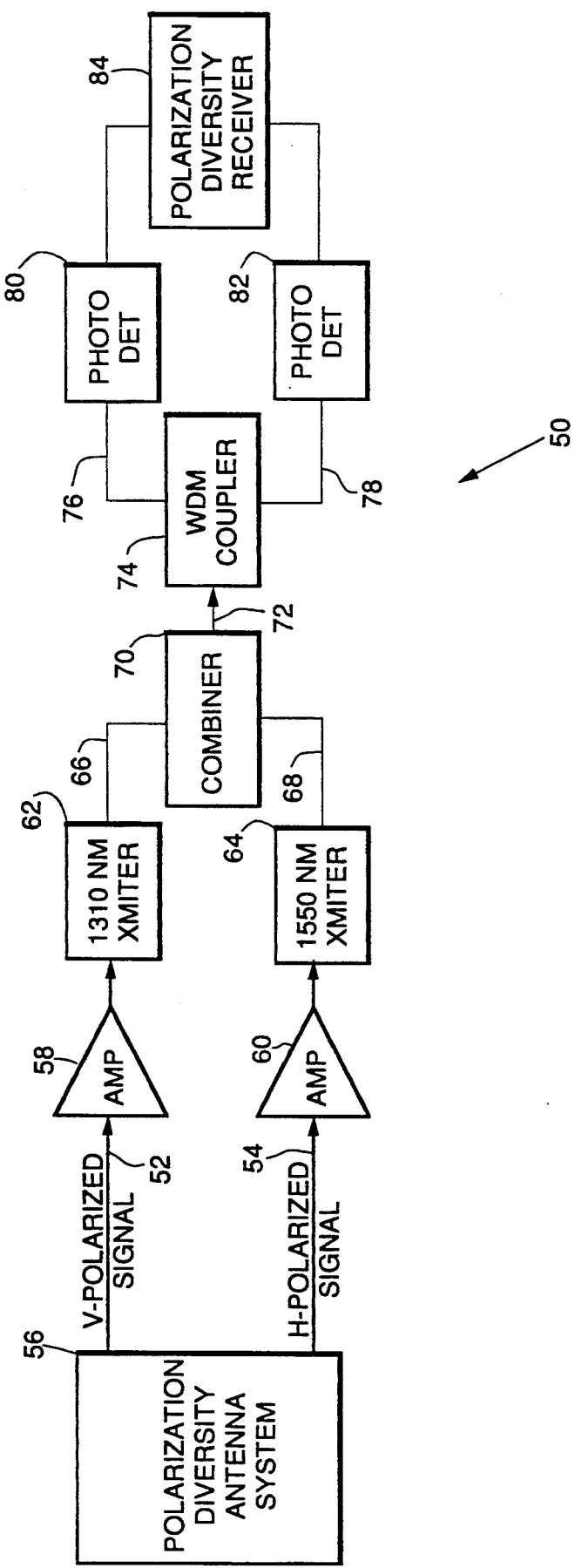

WAVELENGTH DIVISION MULTIPLEXED FIBER OPTIC LINK FOR RF POLARIZATION DIVERSITY RECEIVER

BACKGROUND OF THE INVENTION

This invention relates to a new technique for transmitting the horizontally and vertically polarized signals of a polarization diverse antenna over fiber optics.

The invention simplifies signal transmission between a source such as a communication antenna and a polarization diversity receiver such as the signal processor at a node of a cellular communication system. For example, an RF polarization diversity receiver is used to overcome fading associated with multipath transmission encountered in a cellular network. Conventionally, either two coax transmission lines or two fiber optic links are used to transmit the two differently polarized signals from the antenna to the signal processor at the node. The need for two transmission lines increases system cost. Alternately, one of the polarized signals at the antenna could be frequency shifted with respect to the other so that the signals become frequency multiplexed and can thus be transmitted over a single transmission line. Such frequency division multiplexing approach is widely used in modern telephone system as discussed in "Transmission Systems for Communication" by Members of the Technical Staff, Bell Telephone Laboratories, Bell Telephone Laboratories, Inc. 1970, pages 124-139. This system requires complex frequency shifting electronics at both ends of the transmission line.

It would therefore be advantageous to provide a single fiber optic link between the source and the receiver without using complex frequency shifting electronics and with no interference between the signals.

It would further be advantageous to provide an inexpensive antenna remoting system for cellular telephones.

SUMMARY OF THE INVENTION

In accordance with the invention, a single fiber optic link is used to transmit RF signals of the same frequency but different polarization from a source to a polarization diversity receiver without introducing interference between the signals. The incoming signal of one polarization is used to modulate a laser transmitter operating at one wavelength and the signal of the other polarity is used to modulate a second laser transmitter operating at a different wavelength. The two optical beams are combined in an optical coupler whose output is connected to the transmission fiber leading to the RF polarization diversity receiver. At the receiver, a wavelength division multiplexing (WDM) coupler is used to separate out the two modulated optical carriers. The two RF signals that were used to modulate the laser transmitters can then be separately recovered via photodiodes to provide inputs to the polarization diversity receiver.

BRIEF DESCRIPTION OF THE DRAWING

These and other features and advantages of the present invention will become more apparent from the following detailed description of an exemplary embodiment thereof, as illustrated in the accompanying drawing, in which FIG. 1 is a simplified schematic diagram of a fiber optic link for an RF polarization diversity receiver in accordance with the invention.

DETAILED DESCRIPTION OF THE PREFERRED EMBODIMENT

This invention enables transmission of two RF signals of the same frequency but different polarization over a single fiber optic link without introducing interference between the signals. A schematic of an exemplary system 50 embodying the invention is shown in FIG. 1. At the source end, amplifiers 58 and 60 of appropriate gain and noise figure amplify the respective vertically polarized and horizontally polarized signals on lines 52 and 54 from polarization diversity antenna system 56. The amplifiers are used to overcome the expected electrical-to-optical-to-electrical conversion loss of the fiber optic link (typically about 30 dB, but improving with progress in device fabrication technology) and to maintain system sensitivity. An amplifier with as low a noise figure as possible is desirable to minimize amplifier noise contribution from degrading system sensitivity. A state-of-the-art amplifier has a noise figure of less than 1 dB. In application, the selection is usually determined by a trade-off between cost and performance. A low noise front end amplifier may be expected to cost more since it will add a smaller amount of noise to the communications link and is usually a dominant factor in determining the link sensitivity. A measure of performance in a communication link using digitized signals is the bit error rate (BER) which is determined by the signal-to-noise ratio. For example, for audio communication, a BER of $10^{-4}$ is considered acceptable, while for computer data communication, a BER of the order of $10^{-9}$ or better is typically needed.

The polarization diversity antenna system 56 provides two outputs corresponding to the received signals with vertical and horizontal polarizations. In radio wave propagation with multipath possibilities, signals fading may occur for one polarization and not for the other. A conventional signal level sensing system in the receiver 84 automatically selects the stronger signal for processing thereby enhancing the reliability of the communication system.

Signals of vertical polarization from the antenna system 56 are used to intensity modulate a semiconductor laser transmitter 62 operating at a first wavelength, say 1310 nm. Signals of horizontal polarization are used to intensity modulate a second laser 64 operating at a second wavelength, say 1550 nm, which is different from the first wavelength. A simple approach to intensity modulation of semiconductor laser transmitters is to use the RF signal to modulate the DC bias current of the laser. The optical power output of a semiconductor diode laser is directly proportional to its bias current above its lasing threshold. The frequency response of the laser, which is a measure of how fast the laser output can faithfully follow a modulating time varying signal, is a function of the device construction and packaging. Lasers with frequency response as high as 20 GHz are presently available commercially, and continued improvements in device technology can be expected. Thus, at the present time, depending on the system requirement, a signal up to 20 GHz can be used to directly modulate the bias current of a semiconductor diode laser, resulting in output intensity variations replicating the modulating waveform. This so-called direct modulation technique is well known in the art of fiber optic signal transmission.

The two modulated optical carriers generated by laser transmitters 62 and 64 are coupled into a transmission optical fiber 72 by means of an optical combiner 70. The combiner 70 can be, for example, a low cost 50/50 coupler or a low loss wavelength division multiplexed (WDM) coupler. The 50/50 coupler is widely used where equal two-way branching of the signal from a single source is desired. The 50% coupling means that half of the signal (or 3 db) is lost and the coupler does not provide any wavelength selectivity. The main advantage is its low cost. The WDM coupler, on the other hand, provides wavelength selective coupling. In a 3-port 1310/1550 nm WDM coupler, for example, if ports 2 and 3 respond to 1310 and 1550 nm, respectively, low loss coupling (i.e., loss of less than 1 db) is obtained between the multiplexed port 1 and port 2 for a 1310 nm signal only, and low loss coupling is obtained between ports 1 and 3 for a 1550 nm signal only. Indeed, signals of the wrong wavelengths for a given WDM port are highly attenuated thus providing isolated channelized signal transmission. The disadvantage of the WDM coupler is its higher cost.

The wavelengths 1310 nm and 1550 nm in this exemplary embodiment are chosen for their low fiber transmission loss and ready availability of commercial optoelectronic components at those wavelengths. Furthermore, the wavelength separation of the optical carriers are sufficiently large that economical components can be used to provide the desired performance of high isolation between the two channels without the need for complicated environmental control systems. This is due to the fact that the wavelength of a semiconductor laser is sensitive to temperature and laser bias current. For systems employing dense WDM where the wavelength difference between channels is small, such laser operating parameters need to be stringently controlled to alleviate interference-induced system malfunctions. Precision WDM or filters for dense WDM systems are also more expensive.

The transmission fiber 72 is a standard optical fiber, either single or multimode depending on application requirements. For example, at high RF frequencies and for distances over several kilometers, a single mode fiber is preferred. For short distances, especially at lower RF frequencies and for ease of interconnects, multimode fibers may be used. The relatively large variations of signal propagation velocity with wavelength or dispersion in multimode fibers limits their bandwidth and information carrying capacity.

At the receiver end, a high isolation WDM coupler 74 or demultiplexer is used to separate out the two modulated optical carriers. In a high isolation WDM coupler, the wavelength selectivity of the coupler ports is high. An optical carrier of a specific wavelength only is coupled via the specific coupler port into a particular transmission path while optical carriers at other wavelengths are attenuated or prevented from that path. Thus, the WDM coupler separates information signals into channels according to the wavelength of the optical carrier. This isolation feature of the WDM coupler reduces undesirable interchannel interference and cross talks and provides more reliable information transfer.

Photodiode detectors 80 and 82 are used in each channel to recover the modulating RF signals for input to the polarization diversity receiver 84. For 1310 and 1550 nm carriers commonly employed in fiber optic signal transmission systems, a widely used detector is a PIN diode fabricated using InGaAs semiconductor material. The sensitivity of the detector, as well as its RF frequency response, depends on design and fabrication techniques. The selection of a detector for a particular system is influenced by system design and performance requirements, as well as cost factors. Detectors with frequency response to above 20 GHz are commercially available.

In an exemplary application, the receiver 84 comprises a polarization diversity receiver in a base station of a wireless cellular telephone communication system, and the antenna 56 is the transceiver antenna of the cell or the microcell, in the case where the cell is subdivided into microcells. The antenna siting is critically important in providing good area coverage and reliable communication. The base station provides signal processing functions and a link to the mobile telephone switching center for connection to an installed telephone network. However, the antenna site and the base station need not be co-located. For example, for topological and/or economic reasons, they may be located some distance apart. The low loss wavelength division multiplexed fiber optic transmission system of the invention provides a link between the two sites.

In one exemplary application, two low cost Fabry-Perot lasers, one operating at 1310 nm and the other at 1550 nm, are used as the transmitters 62 and 64. A fused 50/50 fiber coupler is used as combiner 70 for launching the modulated optical signals onto a single mode transmission fiber 72. At the receiver end, a WDM coupler with isolation greater than 42 db between the channels is used to separate the two modulated optical carriers. A high speed photodiode (80 and 82, respectively) is used in each channel to recover the modulating RF signal. The laser transmitters and the photodetectors used have frequency response beyond 1 GHz which is well above the 800–900 MHz band used by the wireless mobile cellular communication system.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An optical fiber transmission link for transmitting signals representing first and second RF signals of different polarizations, comprising:
    first laser transmitter means for generating a first optical laser signal at a first optical wavelength;
    first modulating means for intensity modulating said first laser signal with said first RF signal;
    second laser transmitter means for generating a second optical laser signal at a second optical wavelength;
    second modulating means for intensity modulating said second laser signal with said second RF signal;
    optical combining means for combining said first and second modulated optical signals into a combined optical signal;
    a single transmission optical fiber for conducting said combined optical signal from said optical combining means to a receiving apparatus;
    said receiving apparatus comprising a wavelength selective optical dividing means for separating said combined signal into first and second optical received signals at said respective first and second wavelengths, and first and second photodetecting means responsive respectively to said first and second received signals to provide first and second photodetector signals corresponding to said first and second RF signals.

2. The transmission link of claim 1 wherein said optical combining means comprises a 50%—50% optical coupler.

3. The transmission link of claim 1 wherein said optical combining means comprises a wavelength division multiplexing optical coupler.

4. The transmission link of claim 1 further comprising first and second RF amplifiers for amplifying said respective first and second RF signals so that said first and second modulating means intensity modulates said respective first and second laser signals with said respective amplified first and second RF signals.

5. The transmission link of claim 1 wherein said wavelength selective dividing means comprises a wavelength division multiplexing optical coupler.

6. The transmission link of claim 1 wherein said first RF signal is vertically polarized, and said second RF signal is horizontally polarized.

7. The transmission link of claim 1 wherein said first optical wavelength is 1310 nm, and said second optical wavelength is 1550 nm.

8. An optical fiber transmission link for transmitting vertically and horizontally polarized RF signals from a remote antenna system to a polarization diversity receiver, comprising:

antenna means for generating a vertical polarization RF signal in response to incident vertically polarized RF signals and a horizontal polarization RF signal in response to incident horizontally polarized RF signals;

first laser transmitter means for generating a first optical laser signal at a first optical wavelength;

first modulating means for intensity modulating said first laser signal with said vertical polarization RF signal;

second laser transmitter means for generating a second optical laser signal at a second optical wavelength;

second modulating means for intensity modulating said second laser signal with said horizontal polarization RF signal;

optical combining means for combining said first and second modulated optical signals into a combined optical signal;

a single transmission optical fiber for conducting said combined optical signal from said optical combining means to a link receiving apparatus;

said link receiving apparatus comprising a wavelength selective optical dividing means for separating said combined signal into first and second optical received signals at said respective first and second wavelengths, and first and second photodetecting means responsive respectively to said first and second received signals to provide first and second photodetector signals corresponding to said respective vertical polarization and horizontal polarization RF signals; and a polarization diversity RF receiver responsive to said first photodetector signal and said second photodetector signal.

9. The transmission link of claim 8 wherein said optical combining means comprises a 50%—50% optical coupler.

10. The transmission link of claim 8 wherein said optical combining means comprises a wavelength division multiplexing coupler.

11. The transmission link of claim 8 further comprising first and second RF amplifiers for amplifying said respective vertical polarization and horizontal polarization RF signals so that said first and second modulating means intensity modulates said respective first and second laser signals with said respective amplified vertical polarization and horizontal polarization RF signals.

12. The transmission link of claim 8 wherein said wavelength selective dividing means comprises a wavelength division multiplexing optical coupler.

13. The transmission link of claim 8 wherein said first optical wavelength is 1310 nm, and said second optical wavelength is 1550 nm.

14. A receiver for a wireless cellular telephone communication system, comprising:

antenna means for generating a vertical polarization RF signal in response to incident vertically polarized RF signals and a horizontal polarization RF signal in response to incident horizontally polarized RF signals;

first laser transmitter means for generating a first optical laser signal at a first optical wavelength;

first modulating means for intensity modulating said first laser signal with said vertical polarization RF signal;

second laser transmitter means for generating a second optical laser signal at a second optical wavelength;

second modulating means for intensity modulating said second laser signal with said horizontal polarization RF signal;

optical combining means for combining said first and second modulated optical signals into a combined optical signal;

receiving apparatus comprising a wavelength selective optical dividing means for separating said combined signal into first and second optical received signals at said respective first and second wavelengths;

a single transmission optical fiber for conducting said combined optical signal from said optical combining means to said optical dividing means;

first and second photodetecting means responsive respectively to said first and second received signals to provide first and second photodetector signals corresponding respectively to said vertical and horizontal polarization RF signals; and a polarization diversity RF receiver responsive to said first photodetector signal and said second photodetector signal.

15. The receiver of claim 14 wherein said optical combining means comprises a 50%—50% optical coupler.

16. The receiver of claim 14 wherein said optical combining means comprises a wavelength division multiplexing optical coupler.

17. The receiver of claim 14 further comprising first and second RF amplifiers for amplifying said respective vertical polarization and horizontal polarization RF signals so that said first and second modulating means intensity modulates said respective first and second laser signals with said respective amplified vertical polarization and horizontal polarization RF signals.

18. The receiver of claim 14 wherein said wavelength selective dividing means comprises a wavelength division multiplexing optical coupler.

19. The receiver of claim 14 wherein said first optical wavelength is 1310 nm, and said second optical wavelength is 1550 nm.

* * * * *